United States Patent
Hsieh et al.

(10) Patent No.: US 10,021,342 B2
(45) Date of Patent: Jul. 10, 2018

(54) ELECTRONIC DEVICE AND IMAGE DISPLAYING METHOD THEREOF FOR CATCHING AND OUTPUTTING IMAGE STREAM

(71) Applicant: ABILITY ENTERPRISE CO., LTD., New Taipei (TW)

(72) Inventors: Ping-Yuan Hsieh, New Taipei (TW); Hong-Tze Chen, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 184 days.

(21) Appl. No.: 14/477,327

(22) Filed: Sep. 4, 2014

(65) Prior Publication Data

US 2015/0077616 A1    Mar. 19, 2015

(30) Foreign Application Priority Data

Sep. 18, 2013 (TW) .............................. 102133885 A

(51) Int. Cl.
*H04N 7/01* (2006.01)
*H04N 5/232* (2006.01)
*H04N 5/235* (2006.01)

(52) U.S. Cl.
CPC ......... *H04N 7/0132* (2013.01); *H04N 5/2353* (2013.01); *H04N 5/23232* (2013.01); *H04N 5/23293* (2013.01); *H04N 7/013* (2013.01)

(58) Field of Classification Search
CPC ............. H04N 5/23293; H04N 5/2353; H04N 5/23232; H04N 7/013
USPC ...................................................... 348/333.05
See application file for complete search history.

(56) References Cited

U.S. PATENT DOCUMENTS

| | | | |
|---|---|---|---|
| 7,834,911 B2 | 11/2010 | Muraki | |
| 8,373,790 B2 | 2/2013 | Suto | |
| 9,066,004 B2 | 6/2015 | Suto | |
| 9,100,583 B2 | 8/2015 | Oniki et al. | |
| 2003/0068098 A1* | 4/2003 | Rondinelli | G06T 3/0062 382/276 |
| 2005/0285943 A1* | 12/2005 | Cutler | G06K 9/00295 348/207.1 |
| 2006/0158536 A1* | 7/2006 | Nakayama | H04N 5/202 348/254 |
| 2009/0021576 A1* | 1/2009 | Linder | G03B 37/00 348/36 |
| 2010/0157113 A1 | 6/2010 | Kobayashi | |
| 2010/0321470 A1* | 12/2010 | Oshima | G03B 17/18 348/36 |

(Continued)

FOREIGN PATENT DOCUMENTS

| | | |
|---|---|---|
| CN | 1941918 A | 4/2007 |
| CN | 101285989 A | 10/2008 |

(Continued)

*Primary Examiner* — Antoinette Spinks
(74) *Attorney, Agent, or Firm* — Rabin & Berdo, P.C.

(57) ABSTRACT

An electronic device and an image displaying method are disclosed. The electronic device mainly comprises a sensing module, a signal processor and a display. The sensing module catches a plurality of first images with a first frequency or a first period or catches a plurality of second images with a second frequency or a second period. The signal processor receives the second images and outputs a plurality of third images correspondingly. The display presents the first images or the third images.

19 Claims, 4 Drawing Sheets

(56) References Cited

U.S. PATENT DOCUMENTS

| | | | | |
|---|---|---|---|---|
| 2011/0242274 A1* | 10/2011 | Yamaji | ................ | G06T 3/4038 |
| | | | | 348/36 |
| 2011/0279690 A1* | 11/2011 | Kuroiwa | ............... | G06F 3/1204 |
| | | | | 348/207.2 |
| 2012/0257082 A1* | 10/2012 | Kato | .................... | H04N 5/2357 |
| | | | | 348/229.1 |
| 2013/0002709 A1* | 1/2013 | Yamagata | .............. | H04N 5/772 |
| | | | | 345/619 |
| 2013/0113875 A1* | 5/2013 | Ooshima | ........... | H04N 13/0239 |
| | | | | 348/36 |
| 2013/0216971 A1* | 8/2013 | Friddell | ............... | A61B 5/0088 |
| | | | | 433/29 |
| 2015/0055146 A1* | 2/2015 | Kurigata | ............. | G03G 15/041 |
| | | | | 358/1.1 |

FOREIGN PATENT DOCUMENTS

| | | |
|---|---|---|
| CN | 103259976 A | 8/2013 |
| EP | 2065741 A2 | 6/2009 |

\* cited by examiner

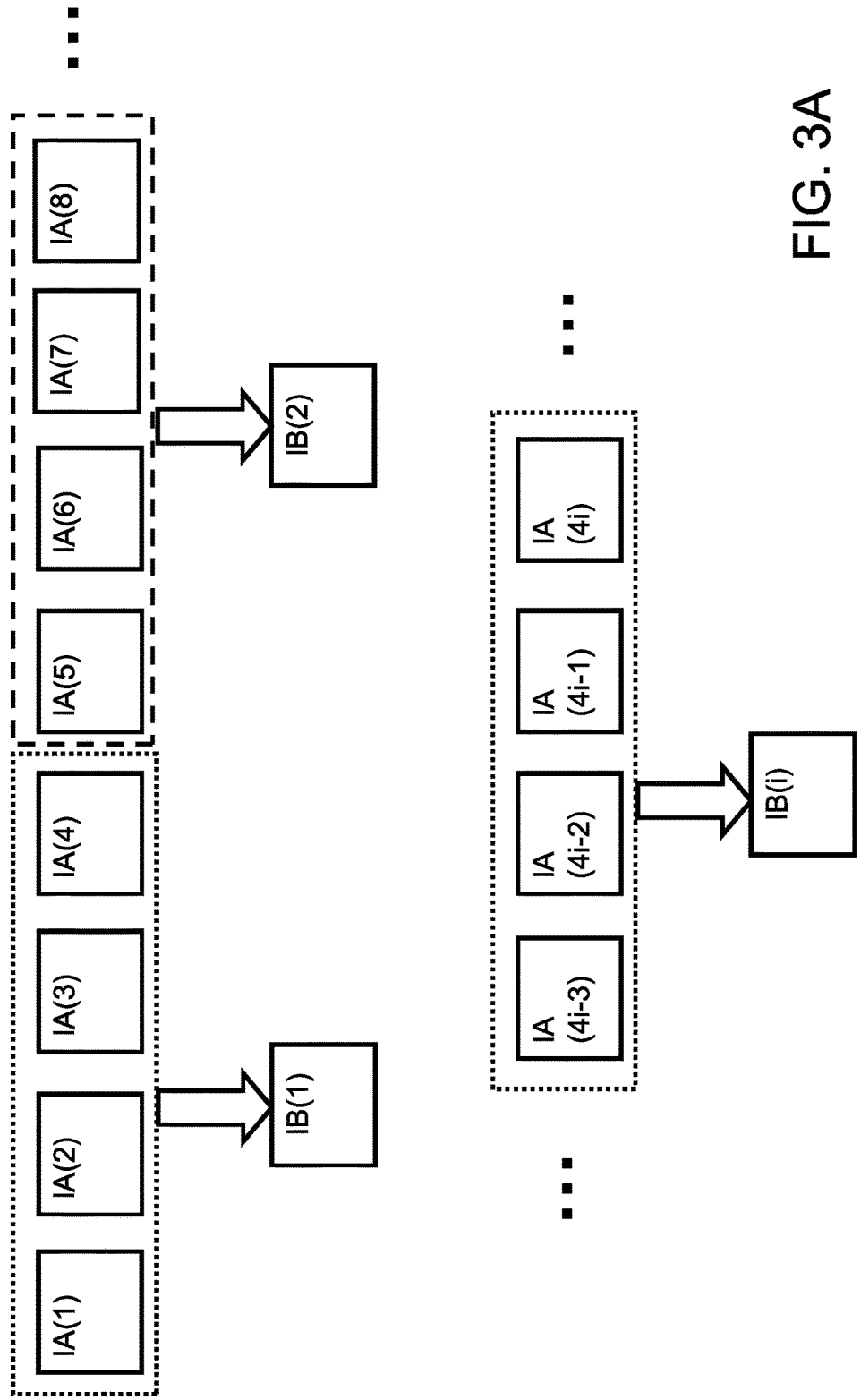

ELECTRONIC DEVICE AND IMAGE DISPLAYING METHOD THEREOF FOR CATCHING AND OUTPUTTING IMAGE STREAM

This application claims the benefit of Taiwan application Serial No. 102133885, filed Sep. 18, 2013, and the subject matter of which is incorporated herein by reference.

BACKGROUND

Technical Field

The present invention relates to an electronic device and an image displaying method thereof, especially to an electronic device and an image displaying method thereof catching and outputting an image stream with different frequencies or periods.

Description of the Related Art

Along with the advance of technology, electronic devices capable of catching and presenting images have become very popular in daily lives. Particularly, current electronic devices usually present real-time image streams with monitors.

However, while the frequency of catching images is increased, the exposure time of each frame of the images is correspondingly decreased. As such, the noise of the images is increased, and hence the display quality of image streams is decreased.

Therefore, there is indeed a need for providing a new electronic device and an image displaying method for solving such known deficiency.

SUMMARY OF THE INVENTION

An object of the embodiments of the present invention is to provide an electronic device and an image displaying method for improving the quality of an image stream.

Accordingly, an electronic device of the present invention includes a sensing module, a lens module, a signal processor, and a display. The sensing module catches a plurality of first images with a first frequency or a first period at a first state or catches a plurality of second images with a second frequency or a second period at a second state. The signal processor is electrically connected to the sensing module and the lens module and controls the lens module actions at the second state. The signal processor receives the second images and outputs a plurality of third images, correspondingly. The display is electrically connected to the signal processor. The display presents the first images at the first state or presents the third images at the second state.

An image displaying method of the present invention includes the following steps: catching a plurality of first images with a first frequency or a first period by a sensing module; presenting the first image by a display; catching a plurality of second images with a second frequency or a second period by the sensing module; using a signal processor outputting a plurality of third images in accordance with computing the second images; and presenting the third images by the display.

BRIEF DESCRIPTION OF THE DRAWINGS

FIG. 3A shows a schematic diagram of producing the third images according to an embodiment of the present invention;

DETAILED DESCRIPTION OF THE INVENTION

In the following description, numerous specific details are set forth in order to provide a thorough understanding of above-mentioned objects, features, and advantages of the present invention. The embodiments of the present invention are described in details with reference to the accompanying drawings.

The electronic device of the present invention is provided with image catching functions, including but not limited to digital cameras, digital video cameras, tachographs, mobile personal communications system, and etc.

Figure 1:
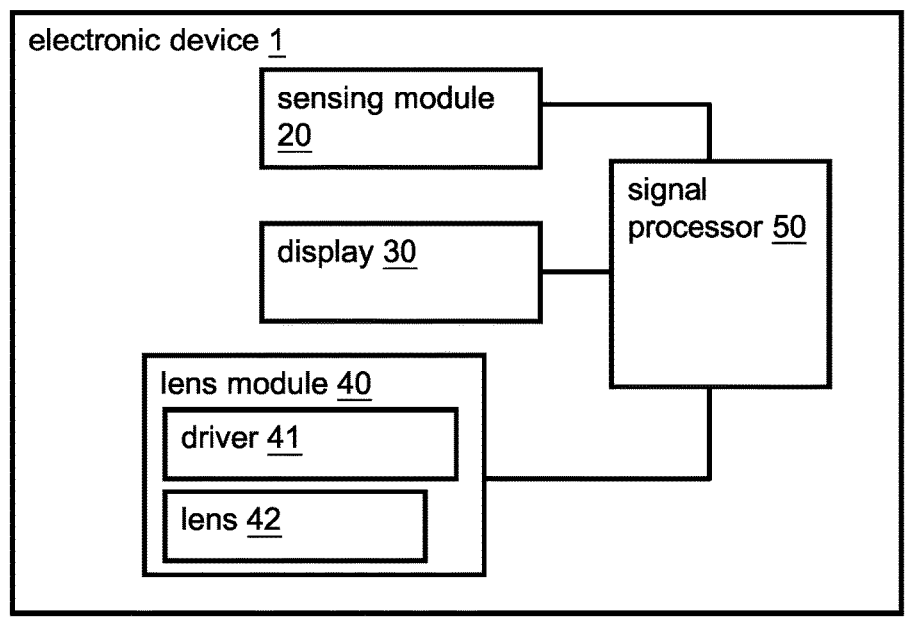
FIG. 1 shows an electronic device according to an embodiment of the present invention.

FIG. 1 shows an electronic device 1 according to an embodiment of the present invention. As shown in FIG. 1, the electronic device 1 mainly includes a sensing module 20, a display 30, a lens module 40, and a signal processor 50.

The sensing module 20 and the signal processor 50 are electrically connected to each other, and the sensing module 20 capable of performing photoelectrical conversion on light beams emitted from objects and outputting corresponding images. The sensing module 20 may include a charge-coupled device (CCD) or a complementary metal-oxide-semiconductor (CMOS) sensing element, but the present invention is not limited thereto.

In an embodiment, the sensing module 20 may catch a plurality of first images with a first frequency, such as with the first frequency of exposing x frames of the first images per second, and then output an image stream including the plurality of first images; that is, the image stream of the first image. At present, the display 30 presents the image stream including the first images. Moreover, the image stream of the first image may be transmitted to the display 30 through the signal processor 50.

On the other hand, in the present embodiment, the sensing module 20 may catch a plurality of second images with a second frequency, such as with a second frequency of exposing y frames of second images per second, and then output an image stream including the plurality of consecutive second images; that is, the image stream of the second image. At present, the signal processor 50 may compute the second images for transforming the second images into a plurality of third images, and further output an image stream including the third images; that is, the image stream of the third image. Herein, y may be an integral multiple of x, for example, y=4x. Concretely speaking, x may be 30, and y may be 120, but not limited thereto.

In another embodiment, the sensing module 20 also may catch the plurality of first images with a first period; that is, each the first image is caught with a first period which is an exposing time of m seconds per frame of the first image, or the sensing module 20 also may catch the plurality of second images with a second period; that is, each the second image is caught with a second period which is an exposing time of n seconds per frame of the second image. Herein, m may be an integral multiple of n, for example, m=4n. Concretely speaking, m may be ⅟30, and n may be ⅟120, but not limited thereto.

It is to be noted that the sensing module 20 catches the first images with a first frequency of x frames per second, which means each frame of the first images is exposed for 1/x second. The second images are caught with a second frequency of y frames per second, which means each frame of the second images is exposed for 1/y second. Concretely speaking, the sensing module 20 may catch the first images with a frequency of 30 frames per second while each frame of the first images is exposed for ⅟30 second, and the sensing module 20 may catch the second images with a frequency of 120 frames per second while each frame of the second images is exposed for ⅟120 second. That is, x=1/m and/or y=1/n, but the present invention is not limited thereto.

On the other hand, a preparation time may be preserved before or after the sensing module 20 catches every frame of the first images, which is advantageous to the transmission of the completed first images or the preparation of catching the next frame of the first images. Therefore, while the sensing module 20 catches the first images with the first frequency of x frames of the first images per second, which may be unequal to an exposing time of 1/x second for each frame of the first images; while the first images are caught with the first period of m seconds per frame of the first images, which may be as well unequal to catching 1/m frames of the first images every second. Similarly, while the sensing module 20 catches the second images with the second frequency of y frames of the second images per second, which may be unequal to an exposing time of 1/y second per frame of the second images; while the second images are caught with the second period, n seconds per frame of the second images, which may be as well unequal to catching 1/n frames of the second images every second. In an embodiment, x is substantially equal to 30, y is substantially equal to 120, m is substantially equal to ⅟30, and n is substantially equal to ⅟120, but the present invention is not limited thereto.

Furthermore, in an embodiment, before the sensing module 20 outputs the first images or the second images, a signal processing of sensor gain may be performed on the first images and/or the second images. In the present embodiment, a corresponding sensor gain of the first images caught by the sensing module 20 is a first gain, and a corresponding sensor gain of the second images caught by the sensing module 20 is a second gain. A sensor gain is proportional to the brightness of an image; that is, while a sensor gain is larger, the first images and/or the second images outputted from the sensing module 20 may have a higher brightness; on the contrary, the first images and/or the second images outputted from the sensing module 20 may have a lower brightness.

Next, the display 30 may be electrically connected to the signal processor 50 and present image streams of the first images or the third images outputted by the sensing module 20.

In an embodiment, the first images and the second images outputted by the sensing module 20 may be computed and/or processed by the signal processor 50 before provided to the display 30. The display 30 may be a liquid crystal monitor, a touch panel, or a flexible display, but not limited thereto.

Besides, the lens module 40 focuses the light beams from the object on the sensing module 20 for forming an image. A zoom image pickup device is taken as an example, the lens module 40 includes a driver 41 and a lens 42. The lens 42 includes a zoom lens (not shown) and a focus lens (not shown). Herein, the zoom lens and the focus lens of the lens 42 may move within a predetermined interval.

In an embodiment, the driver 41 may drive the zoom lens to perform zooming actions, such as zooming-in view ranges or zooming-out view ranges between the tele-end and the wide-end, for making sure that the lens module 40 is positioned at the most appropriate image-pickup interval. Moreover, during a focusing process, the driver 41 may slightly adjust the position of the focus lens for finding the best focus position.

Figure 2:
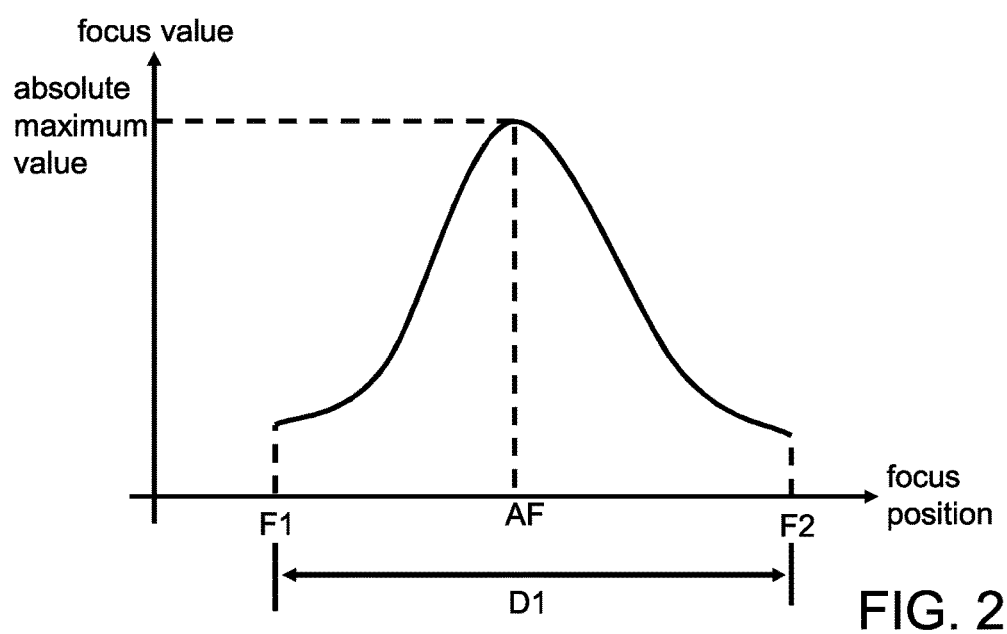
FIG. 2 shows a focusing curve of an electronic device performing a focusing process according to an embodiment of the present invention.

FIG. 2 shows a focusing curve of an electronic device 1 performing a focusing process according to an embodiment of the present invention, wherein the vertical axis represents the focus data, and the horizontal axis represents the focus position of the focus lens.

Referring to FIG. 1 and FIG. 2, in an embodiment, while the electronic device 1 performs the focusing process, the focus lens focuses in a focus interval D1, wherein the distance starting from the first predetermined position F1 to the second predetermined position F2 is defined as the focus interval D1. For example, the driver 41 may drive the focus lens to move the position thereof within the focus interval D1 in a step-by-step fashion. As the focus lens moves by every unit distance, the sensing module 20 catches an image corresponding to each of the positions, and the signal processor 50 analyzes the edge value or the modulation transfer function (MTF) of each of the images for constructing the focusing curve as shown in FIG. 2.

In an embodiment, the signal processor 50 further determines if there is an absolute maximum value or a relative maximum value of an edge curve between the first predetermined position F1 and the second predetermined position F2. If the signal processor 50 determines that an absolute maximum value or a relative maximum value exists, and then that absolute maximum value or relative maximum value is determined to be the best focus position of the electronic device 1.

In an embodiment, the electronic device 1 may enter a first state according to a user's command, and meanwhile, the signal processor 50 makes the sensing module 20 catch a plurality frames of the first images, and then make the display 30 present an image stream formed from the first images. If the electronic device 1 enters a second state, the signal processor 50 would make the sensing module 20 catch a plurality frames of the second images, and then make the display 30 present an image stream formed from the second images. Herein, the electronic device 1 may enter the second state according to a user's control or a decision of a preset program.

Further speaking, in a concrete embodiment, the first state may be a preview mode or a video-catching mode. Meanwhile, the sensing module 20 catches the first images consecutively with the first frequency or the first period according to the command from the signal processor 50 and outputs the image stream of the first image. The second state may refer to the electronic device 1 performing a plurality of actions simultaneously, for example, the zoom lens of the lens module 40 performs the zooming processes during the tele-end and the wide-end at the same time, or the focus lens performs the focusing process within the focus interval D1. At present, the sensing module 20 may catch the second images consecutively with the second frequency or the second period.

In the present embodiment, if the lens module 40 performs the focusing process at the second state, the signal processor 50 would further analyze the edge value or MTF of the second images and obtain the best focus position.

In another embodiment, at the second state, the signal processor 50 provides the image stream of the third image according to the image stream of the second image, and the display 30 presents the image stream including the third images, simultaneously. Concretely speaking, the signal processor 50 may compute the second images from the sensing module 20 sequentially and provide the image stream of the third image to the display 30.

In the present embodiment, the signal processor 50 may perform signal computation according to a first gain of the first images and a second gain of the second images to obtain the third images.

In an embodiment, the sensing module 20 outputs the second images IA(1), IA(2), IA(3), IA(4), . . . , IA(4$i$), and etc., wherein i is an positive integer. The signal processor 50 accumulates a plurality of corresponding pixel values of the second images IA(4$i$−3) to IA(4$i$) for obtaining a frame of the third image IB(i).

That is, the signal processor 50 may accumulate consecutive α frames of the second images IA(α$i$−α+1) to IA(α$i$) for providing a frame of the third images IB(i), wherein α is an integer equal to or larger than 2 and i is an positive integer.

Concretely speaking, the signal processor 50 may accumulate each first pixel value of the consecutive second images IA(4$i$−3) to IA(4$i$) for forming a first pixel value of the third images IB(i), accumulate each second pixel value of the consecutive second images IA(4$i$−3) to IA(4$i$) for forming a second pixel value of the third images IB(i), and likewise. As such, i frames of the third images IB(1) to IB(i) can be obtained from the 4i frames of the second images IA(1) to IA(4$i$).

In another embodiment, the accumulated second images IA(4$i$−3) to IA(4$i$) may be further divided by a constant. Herein, the constant may be a quotient from the second gain of the second images divided by the first gain of the first images.

FIG. 3A shows a schematic diagram of producing the third images according to an embodiment of the present invention.

As shown in FIG. 3A, the sensing module 20 outputs the second images IA(1), IA(2), IA(3), IA(4), IA(5), IA(6), IA(7), IA(8), . . . IA(4$i$), and etc., wherein i is a positive integer. The signal processor 50 respectively divides each frame of the second images IA(1) to IA(4) by a constant first. Herein, the constant may be a quotient from the second gain of the second images divided by the first gain of the first images. Then the signal processor 50 adds up the second images IA(1) to IA(4) divided by the constant to obtain the third image IB(1). Similarly, the signal processor 50 further adds up the second images IA(5) to IA(8) which respectively divided by the constant to obtain the third image IB(2). The following is etc.

In short, the signal processor 50 can respectively divide each frame of the second images IA(4$i$−3) to IA(4$i$) by a constant, which may be a quotient from the second gain divided by the first gain, and then the divided second images are added up to obtain the third image IB(i). On the other hand, the signal processor 50 may add up the second images IA(4$i$−3) to IA(4$i$) followed by dividing them by a constant to obtain the third image IB(i); however, the present invention is not limited thereto.

The concrete formulas are as follows:

Third image $IB(1)$=second image $IA(1)$/(second gain/first gain)+second image $IA(2)$/(second gain/first gain)+second image $IA(3)$/(second gain/first gain)+second image $IA(4)$/(second gain/first gain)

Third image $IB(2)$=second image $IA(5)$/(second gain/first gain)+second image $IA(6)$/(second gain/first gain)+second image $IA(7)$/(second gain/first gain)+second image $IA(8)$/(second gain/first gain)

Third image $IB(i)$=second image $IA(4i-3)$/(second gain/first gain)+second image $IA(4i-2)$/(second gain/first gain)+second image $IA(4i-1)$/(second gain/first gain)+second image $IA(4i)$/(second gain/first gain)

Practically, the signal processor 50 may compute each pixel value of the second images IA(4$i$−3) to IA(4$i$) which correspondingly in positions to form the corresponding pixel value in positions in the third image IB(i).

In an embodiment, the sensing module 20 catches the second image IA(4$i$) with a second frequency, y frames per second, and provides an image stream including the second image IA(4$i$) to the signal processor 50, and the signal processor 50 outputs an image stream including the third image IB(i) to the display 30 with a frequency which outputting y/4 frames of the third image IB(i) per second. Then, the display 30 may present the image stream of the third image IB(i) with the frequency.

In another embodiment, the sensing module 20 catches the second image IA(4$i$) with a second period, exposing n seconds per frame, and provides an image stream including the second image IA(4$i$) to the signal processor 50, and the signal processor 50 outputs an image stream including the third image IB(i) to the display 30 with a period which outputting each frame of the third image IB(i) per 4n seconds. Then, the display 30 may present the image stream of the third image IB(i) with the period.

Figure 3B:
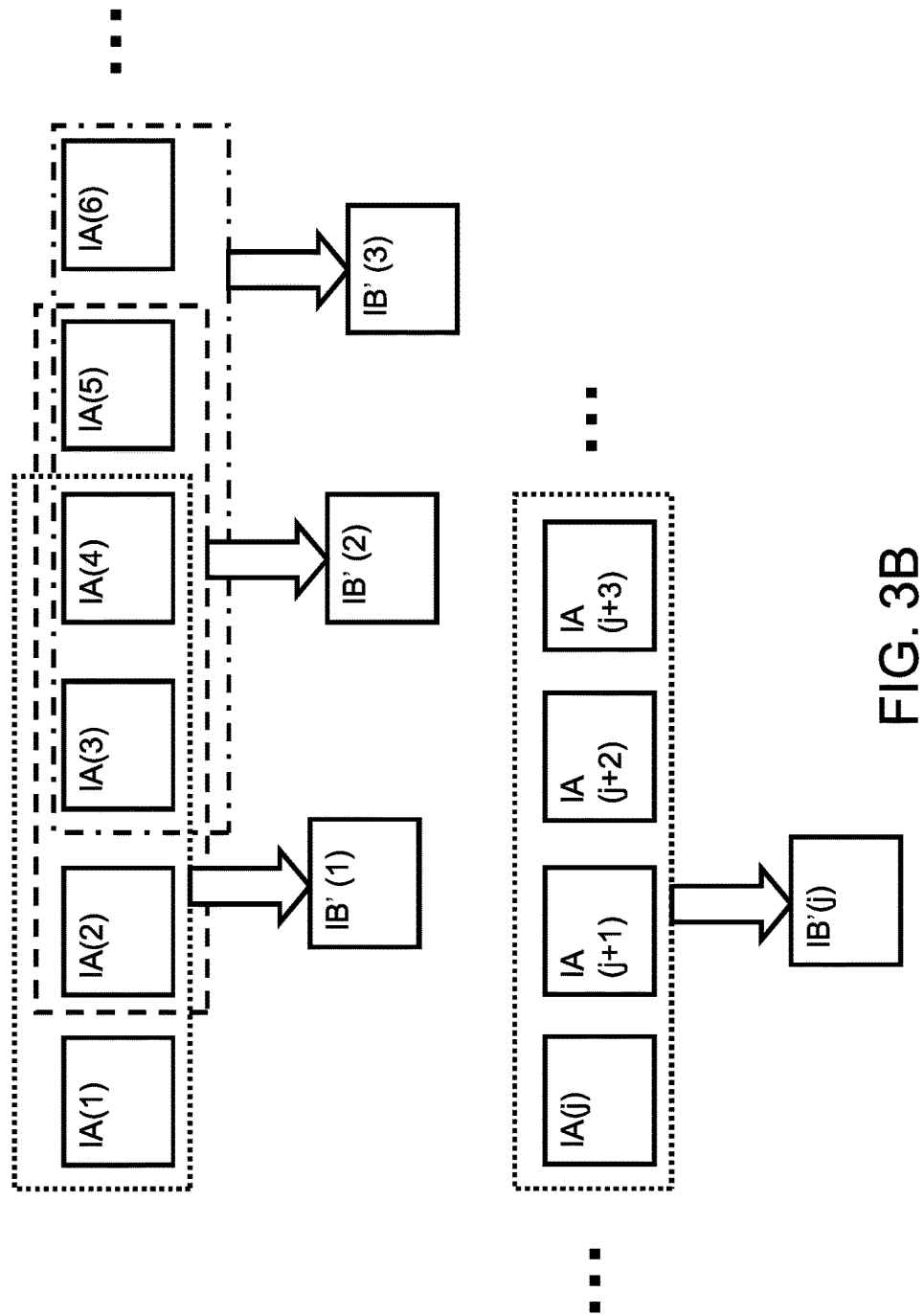
FIG. 3B shows a schematic diagram of producing the third images according to another embodiment of the present invention.

In addition, FIG. 3B shows a schematic diagram of producing the third images according to another embodiment of the present invention.

Referring to FIG. 3B, in the present embodiment, the sensing module 20 outputs the second images IA(1), IA(2), IA(3), IA(4), IA(5), IA(6), . . . IA(j) and etc., wherein j is a positive integer. The signal processor 50 can add up the second images IA(1) to IA(4) to obtain the third image IB'(1), add up the second images IA(2) to IA(5) to obtain the third image IB'(2), and likewise. That is, the signal processor 50 can add up the second images IA(j) to IA(j+3) to obtain the third image IB'(j).

In other words, the signal processor 50 can accumulate sequentially a frames of the second images IA(j) to IA(j+α−1) for providing a frame of the third images IB'(j), wherein α is an integer equal to or larger than 2, and j is a positive integer.

On the other hand, the signal processor 50 further can divide each frame of the second images IA(1) to IA(4) by a constant, which may be a quotient from a second gain divided by a first gain, and then adding up the divided second images to obtain the third image IB'(1). Similarly, each frame of the second images IA(2) to IA(5) also can be divided by the constant and then are added up to obtain the third image IB'(2). Otherwise, the signal processor 50 also may add up the second images IA(j) to IA(j+4) followed dividing by the constant to obtain the third image IB'(j); however, the present invention is not limited thereto.

The concrete formulas are as follows:

Third image $IB'(1)$=second image $IA(1)$/(second gain/first gain)+second image $IA(2)$/(second gain/first gain)+second image $IA(3)$/(second gain/first gain)+second image $IA(4)$/(second gain/first gain)

Third image $IB'(2)$=second image $IA(2)$/(second gain/first gain)+second image $IA(3)$/(second gain/first gain)+second image $IA(4)$/(second gain/first gain)+second image $IA(5)$/(second gain/first gain)

Third image $IB'(j)$=second image $IA(j)$/(second gain/first gain)+second image $IA(j+1)$/(second gain/first gain)+second image $IA(j+2)$/(second gain/first gain)+second image $IA(j+3)$/(second gain/first gain).

Practically, the signal processor 50 may compute each corresponding pixel value of the second images IA(j) to IA(j+3) in positions to form a corresponding pixel value in positions of the third image IB'(j).

In an embodiment, the sensing module 20 catches the second image IA(j) with a second frequency, y frames per second, and provides an image stream including the second image IA(j) to the signal processor 50, and the signal processor 50 outputs an image stream including the third image IB'(j) to the display 30 with a frequency which outputting y/4 frames of the third image IB'(j) per second. Then, the display 30 may present the image stream of the third image IB'(j) with the frequency.

In another embodiment, the sensing module 20 catches the second image IA(j) with a second period, exposing n seconds per frame, and provides an image stream including the second image IA(j) to the signal processor 50, and the signal processor 50 outputs an image stream including the third image IB'(j) to the display 30 with a period which outputting each frame of the third image IB'(j) per 4n seconds. Then, the display 30 may present the image stream of the third image IB'(j) with the period.

It is to be noted that the above-mentioned sensing module 20, the lens module 40, and the signal processor 50 may be arranged as hardware devices, software devices, firmware, or the combinations thereof, and also may be arranged via circuit cycles or in other appropriate fashions. Moreover, each of the modules may be arranged separately or in combination with others. In addition, without describing every possible variations and combinations, only preferred embodiments are described herein to avoid redundancy. However, a person having ordinary skills in the art should understand that the modules and elements described herein are not all necessary. Furthermore, in order to carry out the present invention, other detailed conventional modules or elements may be included as well. Each of the modules or elements may be omitted or modified according to needs, and it is not required to dispose other modules or elements between any two modules.

Figure 4:
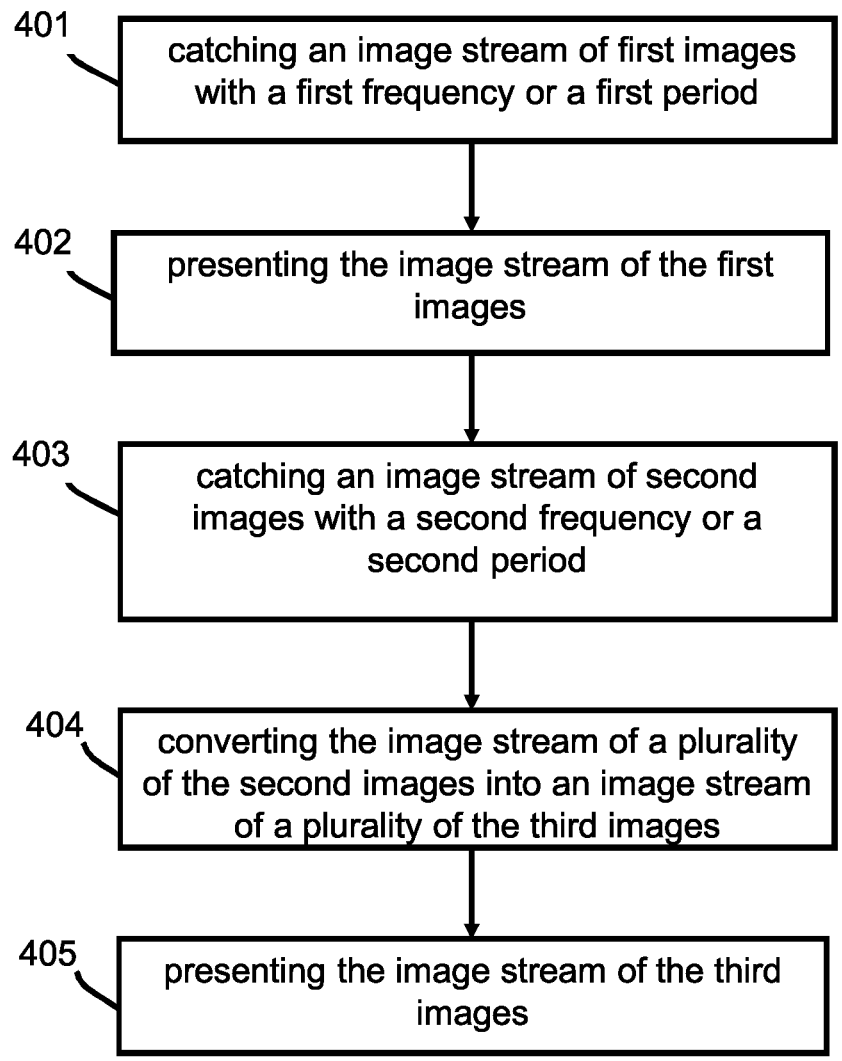
FIG. 4 shows a process flowchart of an image displaying method according to an embodiment of the present invention.

Next, FIG. 4 shows a process flowchart of an image displaying method according to an embodiment of the present invention.

Referring to FIG. 1 and FIG. 4, first, step 401 is performed: performing an image stream catching process at a first state, wherein an image steam having a plurality of frames of the first images is obtained by the sensing module 20. Herein, the sensing module 20 sequentially catches the first images with a first frequency which may be x frames per second, or sequentially catches the first images consecutively with a first period which may be m seconds per frame. For example, the sensing module 20 can catch the first images sequentially with a first frequency of 30 frames per second or with a first period of 1/30 seconds per frame.

Next, step 402 is performed: presenting the image stream of the first image with the display 30. In the present step, the display 30 can sequentially present the first images with a frequency of x frames per second (same with the first frequency) or with a period of m seconds per two Interval frames (same with the first period).

Next, step 403 is performed: the electronic device 1 is switched from the first state to the second state. At present, the sensing module 20 is changed to catch the second images sequentially with a second frequency which may be y frames per second, or with a second period which may be n seconds per frame, and outputs an image stream including the second images. For example, the sensing module 20 can catch the second images with a second frequency of 120 frames per second or with a second period of 1/120 seconds per frame.

In an embodiment, at the second state, the electronic device 1 can catch the image stream of the second image by the sensing module 20 and perform a focus process or a zoom process by the lens module 40 at the same time.

Next, step 404 is performed: transforming the image stream including a plurality of the second images into an image stream including a plurality of the third images by the signal processor 50.

In an embodiment, the signal processor 50 accumulates each pixel value of the plurality of the second images to obtain the corresponding third image.

In another embodiment, the signal processor 50 compute the pixel values of the plurality of the second images according to the first gain of the first images and the second gain of the second images to obtain the image stream of the third image.

Finally, step 405 is performed: presenting the image stream of the third image by the display 30. Herein, the display can present the third images with a frequency of x frames or y frames per second sequentially or can present the third images with a period of m seconds or n seconds per two Interval frames. For example, x=30, y=120, m=30, and/or n=120, but not limited thereto.

Moreover, the image displaying method also can be executed by a program and installed in the electronic device 1.

In an embodiment, when the electronic device 1 is installed with the image displaying method of the present invention, after the program is activated, the electronic device 1 can perform the steps 401 to 405 as shown in FIG. 4.

Besides, the program of the image displaying method of the present invention can be stored in a readable non-transitory storage medium of the electronic device 1.

In an embodiment, when the readable storage medium is electrically connected to the electronic device 1, the electronic device 1 is installed with the program of the image displaying method, and the program is activated, the electronic device 1 can perform the steps 401 to 405 as shown in FIG. 4.

It is to be noted that the image displaying method of the present invention is not limited to the above-mentioned order of performing the steps, and the order of performing the steps can be modified as long as the goal of the present invention is achieved.

While the invention has been described by way of example and in terms of the preferred embodiment(s), it is to be understood that the invention is not limited thereto. On the contrary, it is intended to cover various modifications, equivalents, and similar arrangements and procedures, and the scope of the invention is intended to be limited solely by the appended claims.

What is claimed is:

1. An image displaying method, comprising:
    catching a plurality of first images with a first frequency or a first periodicity by a sensor, and presenting the first images by a display;
    catching a plurality of second images with a second frequency or a second periodicity by the sensor; and using a signal processor; outputting an image stream having a plurality of third images, that is computed from the second images, and presenting, at a certain frame rate, the third images of the image stream frame by frame on the display, with the third images being displayed on the display one frame at a time;

wherein each pixel value of any one of the third images is generated by adding together a plurality of corresponding-position pixel values of the second images.

2. The image displaying method according to claim 1, wherein each a second images are accumulated to form one of the third images, and a is an integer equal to or larger than 2.

3. The image displaying method according to claim 2, wherein the sequential $\alpha$ second images, $IA(\alpha i-\alpha+1)$ to $IA(\alpha i)$, accumulate to form one of the third images $IB(i)$, and i is a positive integer.

4. The image displaying method according to claim 2, wherein the sequential $\alpha$ second images, $IA(j)$ to $IA(j+\alpha-1)$, are accumulated to form one of the third images $IB'(j)$, and j is a positive integer.

5. The image displaying method according to claim 2, wherein pixel values of the second images are accumulated before dividing by a constant, or the pixel values of the second images are divided respectively by the constant before accumulating.

6. The image displaying method according to claim 5, wherein the constant is a second gain of the second images divided by a first gain of the first images, and the first gain is a sensing parameter for the first images and the second gain is a sensing parameter for the second images.

7. The image displaying method according to claim 1, wherein the third images are presented with the first frequency, the first periodicity, the second frequency or the second periodicity.

8. The image displaying method according to claim 1, wherein the second frequency is an integral multiple of the first frequency, and/or the first periodicity is an integral multiple of the second periodicity.

9. An electronic device performing the image displaying method claimed in claim 1.

10. A non-transitory storage medium having stored therein instructions that when executed by a device, cause the device to perform the image displaying method claimed in claim 1.

11. An electronic device, comprising:
a sensor catching a plurality of first images with a first frequency or a first periodicity and catching a plurality of second images with a second frequency or a second periodicity;
a signal processor receiving the second images and outputting an image stream having a plurality of third images, that is computed from the second images; and
a display presenting, at a certain frame rate, the first images or the third images of the image stream frame by frame, with the first images or the third images being displayed on the display one frame at a time;
wherein each pixel value of any one of the third images is generated by adding together a plurality of corresponding-position pixel values of the second images.

12. The electronic device according to claim 11, wherein the signal processor accumulates the adjacent $\alpha$ second images and outputs one of the third images, and a is an integer equal to or larger than 2.

13. The electronic device according to claim 12, wherein the signal processor accumulates the $\alpha$ second images, $IA(\alpha i-\alpha+1)$ to $IA(\alpha i)$, and provides one of the third images $IB(i)$, and i is a positive integer.

14. The electronic device according to claim 12, wherein the signal processor accumulates the $\alpha$ second images, $IA(j)$ to $IA(j+\alpha-1)$, and provides one of the third images $IB'(j)$, and j is a positive integer.

15. The electronic device according to claim 11, wherein the signal processor divides pixel values of the accumulated second images by a constant, or the signal processor divides pixel values of the second images respectively by the constant before accumulating.

16. The electronic device according to claim 15, wherein the constant is a second gain of the second images divided by a first gain of the first images, and the first gain is a sensing parameter for the first images and the second gain is a sensing parameter for the second images.

17. The electronic device according to claim 11, wherein the display presents the first images at a first state or presents the third images at a second state.

18. The electronic device according to claim 17, further comprising a lens module zooming or focusing during the second state.

19. The electronic device according to claim 11, wherein the display presents the third images with the first frequency, the first periodicity, the second frequency, or the second periodicity.

* * * * *